(12) United States Patent
Banner et al.

(10) Patent No.: US 9,405,853 B2
(45) Date of Patent: Aug. 2, 2016

(54) READING OBJECT QUERIES

(71) Applicant: Hewlett-Packard Development Company, L.P., Houston, TX (US)

(72) Inventors: Ron Banner, Haifa (IL); Shahar Golan, Haifa (IL); Omer Barkol, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 481 days.

(21) Appl. No.: 13/919,294

(22) Filed: Jun. 17, 2013

(65) Prior Publication Data
US 2014/0372413 A1   Dec. 18, 2014

(51) Int. Cl.
G06F 17/30   (2006.01)

(52) U.S. Cl.
CPC .... *G06F 17/30958* (2013.01); *G06F 17/30979* (2013.01)

(58) Field of Classification Search
CPC ............... G06F 17/30958; G06F 17/30979
USPC ........................................................ 707/722
See application file for complete search history.

(56) References Cited

U.S. PATENT DOCUMENTS

| | | | |
|---|---|---|---|
| 5,634,051 A | 5/1997 | Thomson | |
| 6,154,220 A * | 11/2000 | Prakriya | G06F 17/30958 345/440 |
| 6,263,328 B1 | 7/2001 | Coden et al. | |
| 6,738,759 B1 | 5/2004 | Wheeler et al. | |
| 7,844,595 B2 | 11/2010 | Canright et al. | |
| 8,356,035 B1 * | 1/2013 | Baluja | G06F 17/30247 707/741 |
| 8,429,163 B1 * | 4/2013 | Ahmadullin | G06F 17/30011 382/305 |
| 8,583,659 B1 * | 11/2013 | Alexandrescu | G06F 17/30958 707/705 |
| 8,825,646 B1 * | 9/2014 | Alpert | H04L 67/327 707/737 |
| 2002/0069218 A1 * | 6/2002 | Sull | G06F 17/30796 715/202 |
| 2008/0040699 A1 * | 2/2008 | Okada | G06F 17/5045 716/104 |
| 2009/0204554 A1 * | 8/2009 | Koren | G06F 17/30958 706/12 |
| 2010/0211924 A1 * | 8/2010 | Begel | G06F 8/74 717/101 |
| 2010/0250625 A1 * | 9/2010 | Olenick | G06F 17/30607 707/810 |

(Continued)

FOREIGN PATENT DOCUMENTS

| | | | | |
|---|---|---|---|---|
| CH | WO 2014002064 A1 * | 1/2014 | | G06F 17/30017 |
| EP | 2000925 A1 | 12/2008 | | |

OTHER PUBLICATIONS

Tong et al., "Random Walk with Restart: Fast Solutions and Applications", Knowledge and Information Systems 14(3): pp. 327-346, 2008.*

(Continued)

*Primary Examiner* — Phuong Thao Cao

(74) *Attorney, Agent, or Firm* — Hewlett Packard Enterprise Patent Department

(57) ABSTRACT

Disclosed herein are a system, non-transitory computer readable medium, and method for responding to a query having a plurality of input objects. A subgraph based on a main graph of objects is used to generate a list of objects associating the input objects.

17 Claims, 4 Drawing Sheets

(56) References Cited

U.S. PATENT DOCUMENTS

| | | | | |
|---|---|---|---|---|
| 2010/0274804 A1* | 10/2010 | Muskal | ............ | G06F 17/30864 707/769 |
| 2011/0137902 A1* | 6/2011 | Wable | ............... | G06F 17/30867 707/737 |
| 2011/0268364 A1* | 11/2011 | Hido | ................. | G06F 17/30958 382/218 |
| 2011/0270851 A1* | 11/2011 | Mishina | ............ | G06F 17/30982 707/749 |
| 2012/0158639 A1* | 6/2012 | Moore | ............... | G06F 17/30533 706/55 |
| 2013/0132402 A1* | 5/2013 | Yang | ................. | G06F 17/30256 707/748 |
| 2013/0191372 A1* | 7/2013 | Lee | .................. | G06F 17/30958 707/722 |
| 2013/0230255 A1* | 9/2013 | Wang | ............... | G06F 17/30247 382/201 |
| 2013/0268533 A1* | 10/2013 | Komarov | .......... | G06F 17/30958 707/740 |
| 2013/0339352 A1* | 12/2013 | Jin | .................... | G06F 17/30958 707/736 |
| 2014/0040244 A1* | 2/2014 | Rubinstein | ........ | G06F 17/30528 707/722 |
| 2014/0172914 A1* | 6/2014 | Elnikety | ........... | G06F 17/30979 707/774 |
| 2014/0214877 A1* | 7/2014 | Yildiz | ...................... | G06F 3/00 707/758 |
| 2014/0214945 A1* | 7/2014 | Zhang | .................. | H04L 67/306 709/204 |
| 2014/0304278 A1* | 10/2014 | Kleiman | .......... | G06F 17/30277 707/749 |
| 2014/0337306 A1* | 11/2014 | Gramatica | ........ | G06F 17/30731 707/706 |
| 2014/0351241 A1* | 11/2014 | Leask | ............... | G06F 17/30958 707/722 |
| 2014/0372413 A1* | 12/2014 | Banner | ............. | G06F 17/30958 707/722 |
| 2016/0004787 A1* | 1/2016 | Shinkuma | ......... | G06F 17/30587 707/798 |

OTHER PUBLICATIONS

Muller et al., "Ranking Outlier Nodes in Subspaces of Attributed Graphs", In ICDE Workshop, pp. 216-222 (7 pages), 2013.*

Nie et al., "Object-Level Ranking: Bringing Order to Web Objects", In Proceedings of the 14th International Conference on World Wide Web (WWW '05), pp. 567-574 (8 pages), 2005.*

Thanh Tran et al., "Top-k Exploration of Query Candidates for Efficient Keyword Search on Graph-Shaped (RDF) Data," IEEE International Conference on Data Engineering, Nov. 26, 2009, pp. 405-416, IEEE, Available at: <people.aifb.kit.edu/dtr/papers/keywordtopk.pdf>.

* cited by examiner

READING OBJECT QUERIES

Search-by-Example is a database search in which objects are used as query terms instead of keywords. Such objects may include articles, movies, or pictures. Objects that are "similar" to the input objects may be returned in response to the query.

DETAILED DESCRIPTION

Figure 1:
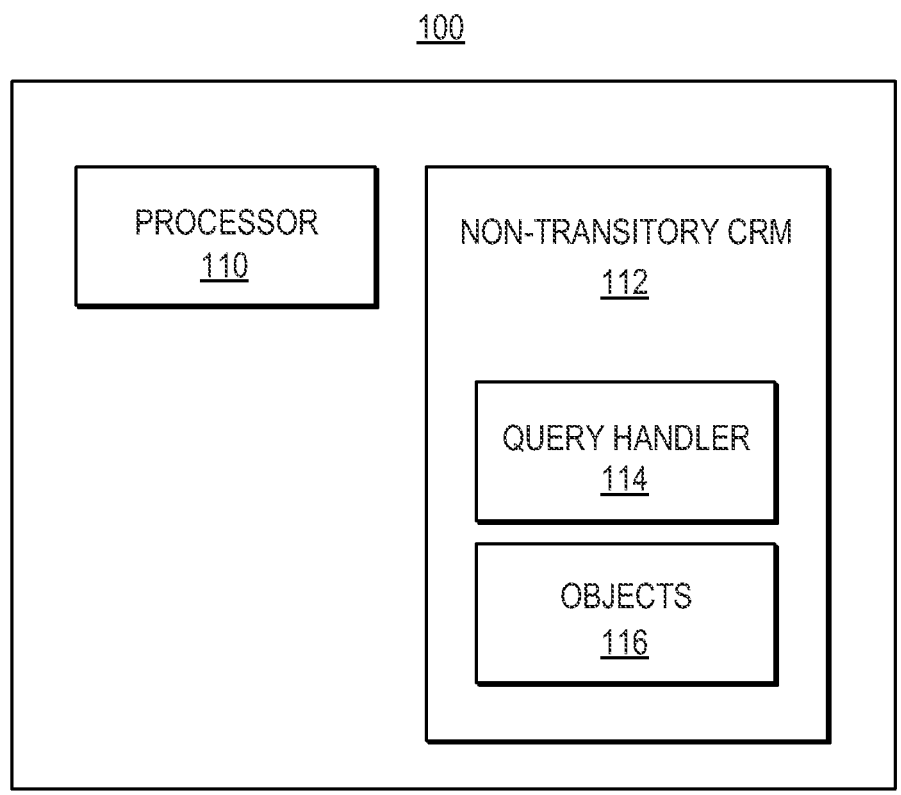
FIG. 1 is a block diagram of an example system in accordance with aspects of the present disclosure.

As noted above, search-by-example queries may comprise objects as search terms such that the response thereto contains objects that are "similar" to the input objects. One way to respond to these queries is by using a predetermined weighted graph structure comprising multiple interlinked objects. Through the use of an algorithm known as random walk with restart ("RWR"), each input object may be located in the graph and other objects in the graph may be given a score that indicates its "similarity" or relevance to each input object. Some conventional techniques may invoke the RWR algorithm for each input object independently and may return a sum of the most relevant objects in response to the query.

Unfortunately, conventional techniques like the one described above may be inadequate when the input objects are very diverse or when there is a great contrast between the input objects. For example, if the input objects include a video concerning cats and a video concerning dogs, conventional techniques may return videos pertaining to domestic animals, which may be regarded as a quality result. However, if an input object concerns cats and the other concerns space travel, conventional techniques may not return quality results due to the vast difference between the two input objects. Instead, the results may be disproportionally associated with cats or disproportionally associated with space travel, but the results may not associate the two objects in a fairly balanced manner.

In view of the foregoing, disclosed herein are a system, non-transitory computer readable medium, and method for responding to object queries. In one example, a subgraph in a main graph of interconnected objects may be used to generate a list of objects that associates the input objects in a query. In another example, a link between each pair of objects in the main graph may represent a distance measure or metric between each pair of objects. In yet a further example, the subgraph may be such that a total distance between each pair of input objects and a central object in the subgraph is minimized. The techniques disclosed herein may generate quality results to queries comprising objects that seem very different from each other. Rather than analyzing each input object individually, the analysis may be based on a subgraph in the main graph with the shortest interconnect between the input objects. Thus, instead of providing a score indicative of a "similarity" or relevance to each input object, the score may be indicative of a similarity or relevance to the subgraph. Tests on different data sets have indicated that the system, non-transitory computer readable medium, and method of the present disclosure outperform conventional techniques. The aspects, features and advantages of the present disclosure will be appreciated when considered with reference to the following description of examples and accompanying figures. The following description does not limit the application; rather, the scope of the disclosure is defined by the appended claims and equivalents.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network. The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a query handler 114. Furthermore, non-transitory CRM 112 may comprise an objects database 116 that may read and analyzed by processor 110. As will also be discussed in more detail below, a main graph in objects database 116 may comprise a plurality of interconnected objects. Non-transitory CRM 112 may be used by or in connection with any instruction execution system that can fetch or obtain the logic therefrom and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in query handler 114 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

In one example, objects database 116 may be arranged as a graph data structure that may be stored in computer registers, in a relational database as a table having a plurality of different fields and records, XML documents or flat files. The graph data structure in objects database 116 may be the main graph of the system and may comprise interconnected objects with a link between each pair of objects therein. The link may represent a distance measure between each pair of objects that indicates a similarity therebetween. Query handler 114 may instruct processor 110 to read a query comprising a plurality of input objects. Query handler 114 may also instruct processor 110 to locate each input object in the main graph. In a further example, query handler 114 may detect a subgraph in the main graph such that a total distance between each pair of input objects and a central object of the detected subgraph is minimized. In another aspect, query handler 114 may also generate an ordered list of objects from the main graph that associate the input objects in the query. The selection of each listed object may be based at least partially on the subgraph.

Figure 2:
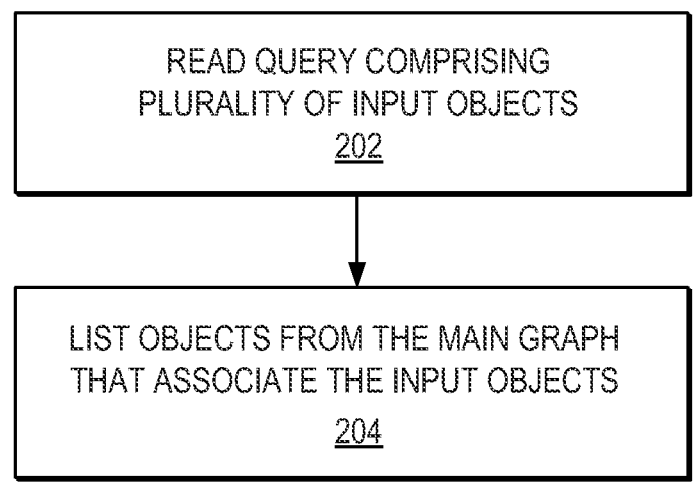
FIG. 2 is a flow diagram of an example method in accordance with aspects of the present disclosure.
Figure 3:
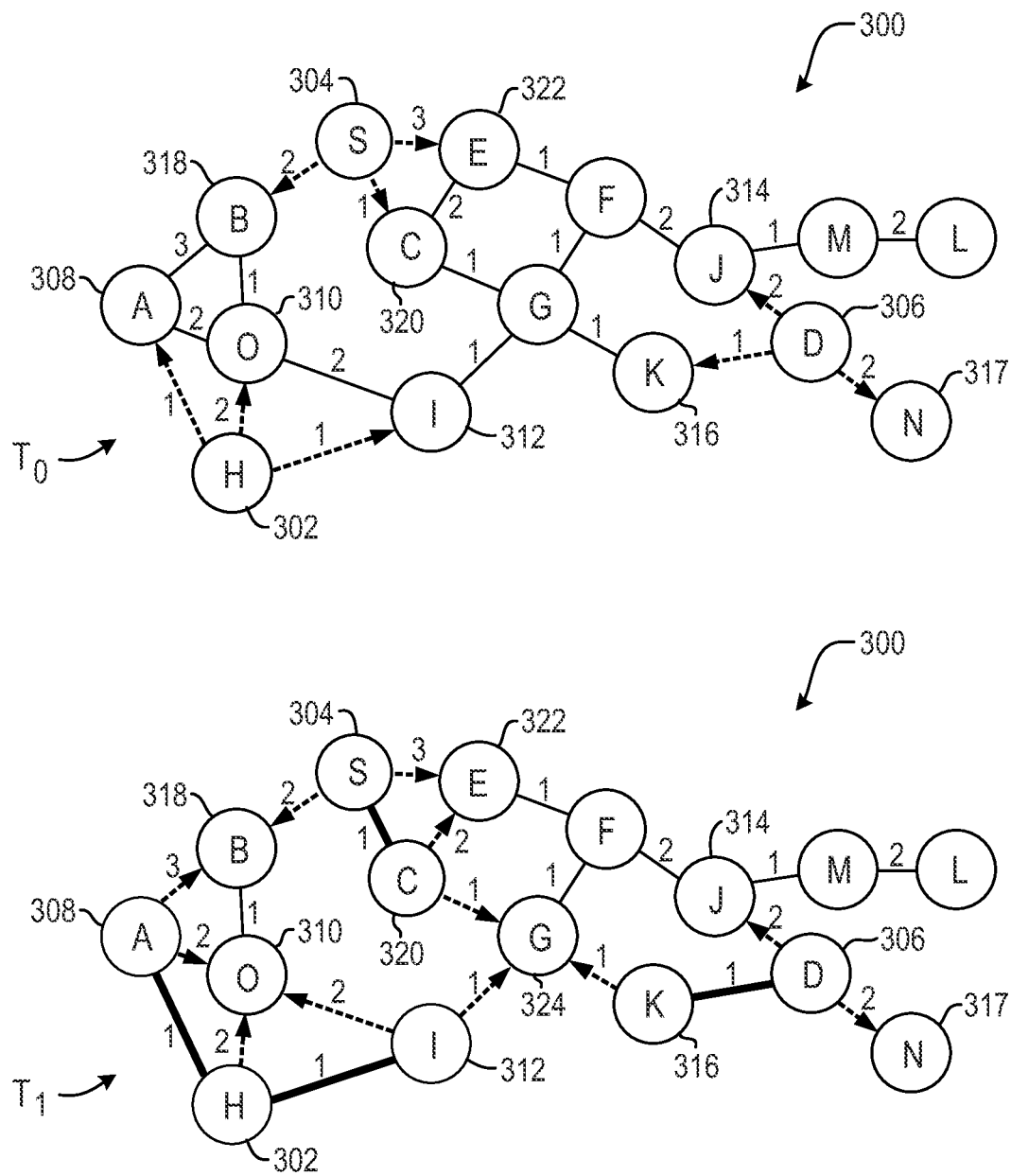
FIG. 3 is an example graph database at different stages in accordance with aspects of the present disclosure.
Figure 4:
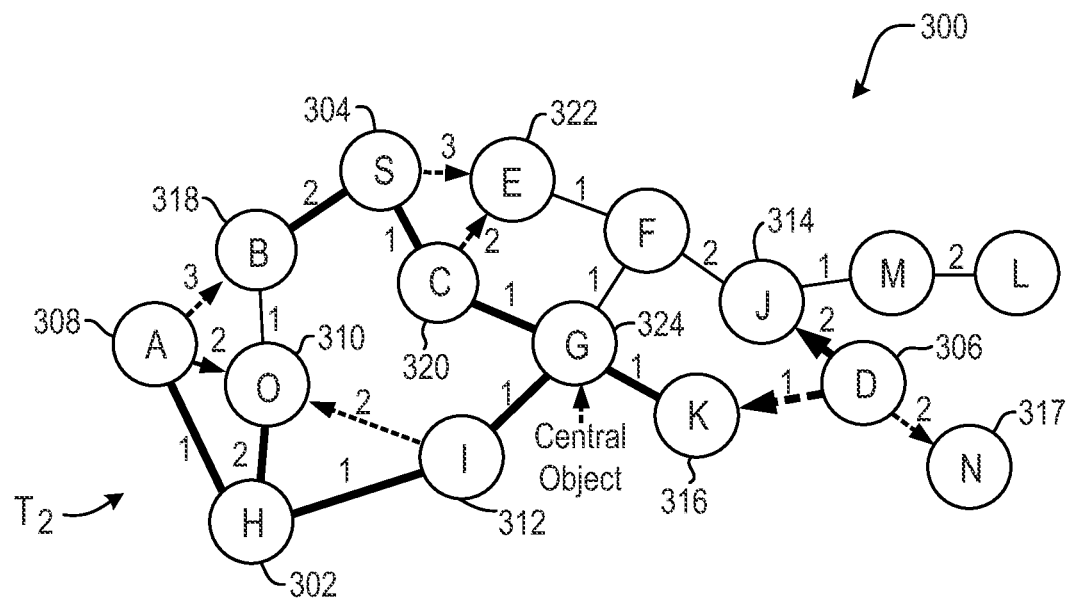
FIG. 4 is the example graph of FIG. 3 at further stages in accordance with aspects of the present disclosure.
Figure 4:
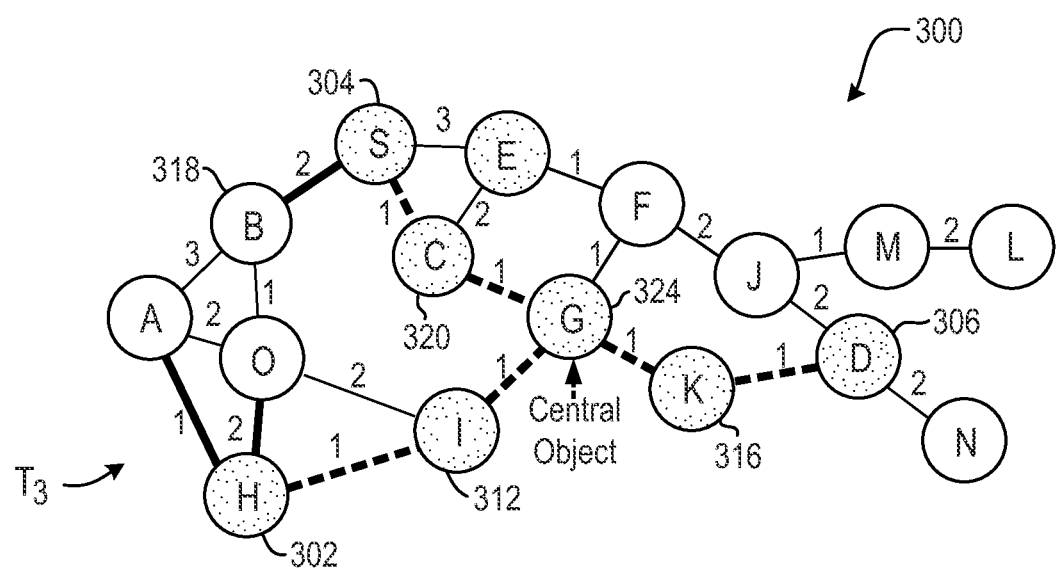

Working examples of the system, method, and non-transitory computer-readable medium are shown in FIGS. 2-4. In particular, FIG. 2 illustrates a flow diagram of an example method 200 for responding to object queries. FIGS. 3-4 show an example graph data structure at different stages in accordance with aspects of the present disclosure. The actions shown in FIGS. 3-4 will be discussed below with regard to the flow diagram of FIG. 2.

As shown in block 202 of FIG. 2, a query comprising a plurality of input objects may be read. The input objects may be searched in the main graph contained in objects database 116. Referring now to the example of FIG. 3, an example main graph 300 is shown at time $T_0$ and time $T_1$. By way of example, the query handler may receive a query with the three following objects: "H," "S," and "D." In the example graph 300, the matching objects are located in nodes 302, 304, and 306. As noted above, the link or association between each pair of objects in main graph 300 may represent a distance measure between each pair of objects. In turn, the distance measure may be indicative of a similarity between each pair of objects of the graph. In the example of FIG. 3, each link between each pair of nodes of main graph 300 is shown with a number representative of the distance measure.

Referring back to FIG. 2, a list of objects that associate the input objects may be generated from the main graph such that the list is at least partially based on a subgraph, as shown in block 204. In one example, a subgraph may be detected or identified such that the total distance between each input object and a central object in the subgraph is minimized. Construction of the subgraph may be carried out in a variety of ways. In one example, a message may be broadcast from each input object located in the main graph. In another aspect, it may be determined which object in the main graph is the first object to receive each message broadcast by each input object. In a further example, the first object to receive each message may be appointed as the central object of the subgraph. Referring back to FIG. 3, at time $T_0$, input objects H, S, and D in nodes 302, 304, and 306 respectively are shown broadcasting messages to their respective neighbors. Object H of node 302 is shown broadcasting a message to objects A, O, and I located in nodes 308, 310, and 312 respectively; object S of node 304 is shown broadcasting a message to objects B, C, and E located in nodes 318, 320, and 322 respectively; and, object D in node 306 is shown broadcasting a message to objects J, K, and N located in nodes 314, 316, and 317 respectively. The content of the message may be irrelevant and may be any arbitrary information, since the purpose of the broadcast may be to detect the central object between the input objects. Referring now to the graph 300 at time $T_1$, all the neighboring nodes are shown forwarding the message to their respective neighbors. Object A in node 308 is shown forwarding the message to objects B and O located in nodes 318 and 310 respectively; object C in node 320 is shown forwarding the message to objects E and G in nodes 322 and 324 respectively; object I is shown forwarding the message to objects O and G in nodes 310 and 324 respectively; and, object K is shown forwarding the message to object G in node 324.

In the example of FIG. 3, at time $T_1$, object G in node 324 has received the message originating from input object H in node 302 via object I in node 312; furthermore, at time $T_1$, object G has received the message originating from input object S in node 304 via object C in node 320. Referring now to FIG. 4, main graph 300 is shown at time $T_2$ and time $T_3$. At time $T_2$, object G in node 324 also receives the message originating from input object D in node 306 via object K in node 316. Thus, in this example, object G may be deemed the central object, since it is the first object to receive each message transmitted by each input object (i.e., objects H, S, and D).

At time $T_3$ of FIG. 4, the subgraph is shown being constructed around the central object G in node 324. The subgraph may comprise the originating input objects (i.e., H, S, and D) and the objects traveled through to arrive at the central object. In one example, each object on a shortest path between each input object and the central object may be detected and each detected object positioned on the shortest path may be included in the subgraph. The shortest distance may be determined based on the distance measure between the nodes. In this example, the shortest distance between input object H in node 302 and the central object G is via object I in node 312. Thus, object I is included in the example subgraph. Furthermore, the shortest distance between input object S in node 304 and the central object G is via object C in node 320. Therefore, object C is also included in the example subgraph. Moreover, the shortest distance between input object D in node 306 and the central object G is through object K in node 316. As such, object K is also included in the example subgraph. In sum, the subgraph includes the following objects: H, I, G, C, S, K, and D.

As noted above, an ordered list of objects may be returned as a reply to the query. The selection of each listed object may be based at least partially on the subgraph. As also noted above, some conventional techniques use RWR to calculate the "similarity" between each object in the graph and each input object. In this instance, a given input object from the query may be used as a "starting node" in the RWR algorithm. A "random walker" may iteratively walk toward the neighbors of the starting node such that the probability of walking to a node may be proportional to the associative weight of the link connecting the each pair of nodes in the graph. A given node Q in the graph may receive a score based on the probability that the walker would travel back to the starting node S from Q. This probability score may indicate the similarity or relevancy between the given node Q and the starting node S. However, when the nodes in a properly constructed subgraph are collectively used as starting nodes, the quality of the results is enhanced. For example, the nodes H, I, G, C, S, K, and D in the sample subgraph shown at time $T_3$ of FIG. 4 may used as the starting nodes in the RWR procedure. In this example, the RWR algorithm may score a given object in the main graph (e.g., object L) based on the probability that the "random walker" would return to any of the nodes in the subgraph.

Advantageously, test results show that the foregoing system, method, and non-transitory computer readable medium enhance the quality of results made to object queries. In this regard, rather than analyzing each input object individually, a preliminary subgraph may be generated and used as a basis for further analysis. For example, using a detected subgraph as starting nodes for the RWR algorithm generates a list of objects that are scored based on their "similarity" to the subgraph. In turn, the listed objects associate the input objects better than conventional techniques.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   a processor;
   a memory comprising a data structure, the data structure comprising a main graph of interconnected objects comprising a link between each pair of objects that represents a distance measure therebetween; and
   a query handler, implemented via the processor, to:
   read a query comprising a plurality of input objects;
   locate each input object in the main graph;
   detect a subgraph in the main graph such that a total distance between each input object and a central object of the detected subgraph is minimized by:
      broadcasting a message from each input object located in the main graph,
      determining which object in the main graph is a first object to receive each message broadcast by each input object, and
      appointing the first object to be the central object of the subgraph; and
   generate an ordered list of objects from the main graph that associates the plurality of input objects in the query, the ordered list of objects being based at least partially on the subgraph.

2. The system of claim 1, wherein the distance measure is indicative of a similarity between each pair of objects.

3. The system of claim 1, wherein to detect the subgraph, the query handler is to detect each object positioned on a shortest path between each input object and the central object.

4. The system of claim 3, wherein to detect the subgraph, the query handler is to include in the subgraph each object detected on the shortest path between each input object and the central object.

5. The system of claim 1, wherein to generate the ordered list of objects, the query handler is to employ random walk with restart on the main graph such that nodes containing objects of the subgraph are used as starting nodes.

6. The system of claim 1, wherein the query handle is further to:
   determine the central object of the subgraph based on determining a shortest distance between each input object and the central object.

7. A non-transitory computer readable medium having instructions therein which, if executed, cause at least one processor to:
   read a query comprising a plurality of input objects;
   search for each input object in a main graph comprising a plurality of objects and a distance metric associating each pair of objects therein;
   identify a subgraph in the main graph such that a total distance between each input object and a central object of the identified subgraph is minimized by:
      broadcasting a message from each input object located in the main graph,
      determining which object in the main graph is a first object to receive each message broadcast by each input object, and
      appointing the first object to be the central object of the subgraph; and
   generate an ordered list of objects from the main graph that associate the plurality of input objects such that the ordered list of objects is based at least partially on the subgraph.

8. The non-transitory computer readable medium of claim 7, wherein the distance metric between each pair of objects indicates a similarity between each pair of objects.

9. The non-transitory computer readable medium of claim 7, wherein the instructions stored therein, if executed, instructs at least one processor to detect each object positioned on a shortest path between each input object and the central object.

10. The non-transitory computer readable medium of claim 9, wherein the instructions stored therein, if executed, instructs at least one processor to include in the subgraph each detected object on the shortest path between each input object and the central object.

11. The non-transitory computer readable medium of claim 7, wherein the instructions therein, if executed, further instruct at least one processor to generate the ordered list of objects using random walk with restart on the main graph such that nodes containing objects of the subgraph are used as starting nodes.

12. A method comprising:
   reading, using at least one processor, a query comprising a plurality of input objects;
   locating, using at least one processor, each input object in a database comprising a main graph of interconnected objects with a distance metric associating each pair of objects therein;
   constructing, using at least one processor, a subgraph of objects from the main graph such that a total distance between each input object and a central object of the constructed subgraph is minimized by:
      broadcasting a message from each input object located in the main graph,
      determining which object in the main graph is a first object to receive each message broadcast by each input object, and
      appointing the first object to be the central object of the subgraph; and
   responding, using at least one processor, to the query with a ranked list of objects from the main graph that represent associations between the plurality of input objects, generation of the ranked list of objects to be based at least partially on the subgraph.

13. The method of claim 12, wherein the distance metric between each pair of objects indicates a similarity between each pair of objects.

14. The method of claim 12, wherein constructing the subgraph further comprises detecting, using at least one processor, each object positioned on a shortest path between each input object and the central object.

15. The method of claim 14, wherein constructing the subgraph further comprises including in the subgraph, using at least one processor, each object detected on the shortest path between each input object and the central object.

16. The method of claim 12, wherein generating the ranked list comprises executing, using at least one processor, random walk with restart on the main graph such that nodes containing objects of the subgraph are used as starting nodes.

17. The method of claim 12, further comprising:
- determining the central object of the subgraph by determining a shortest distance between each input object and the central object.

\* \* \* \* \*